US011516449B2

(12) United States Patent
Tang et al.

(10) Patent No.: US 11,516,449 B2
(45) Date of Patent: Nov. 29, 2022

(54) PIXEL VALUE CALIBRATION METHOD AND PIXEL VALUE CALIBRATION DEVICE

(71) Applicant: REALTEK SEMICONDUCTOR CORPORATION, Hsinchu (TW)

(72) Inventors: Wan-Ju Tang, Hsinchu (TW); Tsung-Hsuan Li, Hsinchu (TW); Shih-Tse Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 141 days.

(21) Appl. No.: 17/147,229

(22) Filed: Jan. 12, 2021

(65) Prior Publication Data

US 2021/0227189 A1    Jul. 22, 2021

(30) Foreign Application Priority Data

Jan. 20, 2020    (TW) .................................. 109101973

(51) Int. Cl.
*G06T 5/00*        (2006.01)
*H04N 9/64*        (2006.01)

(52) U.S. Cl.
CPC ............. *H04N 9/646* (2013.01); *G06T 5/001* (2013.01); *G06T 2207/10024* (2013.01); *G06T 2207/20024* (2013.01)

(58) Field of Classification Search
CPC .... H04N 9/646; H04N 9/04515; G06T 5/001; G06T 2207/10024; G06T 2207/20024
USPC ........................................................ 382/100
See application file for complete search history.

(56) References Cited

U.S. PATENT DOCUMENTS

| 9,313,467 B2 | 4/2016 | Chen et al. |
| 10,346,955 B2 | 7/2019 | Li et al. |
| 2008/0063269 A1 | 3/2008 | Chiu |

(Continued)

FOREIGN PATENT DOCUMENTS

| CN | 107734211 A | 2/2018 |
| CN | 108737751 A | 11/2018 |
| CN | 109642823 A | 4/2019 |

OTHER PUBLICATIONS

English Abstract of CN108737751A.

(Continued)

*Primary Examiner* — Ali Bayat
(74) *Attorney, Agent, or Firm* — WPAT, P.C., Intellectual Property Attorneys; Anthony King (57) ABSTRACT

A pixel value calibration method includes: obtaining input image data generated by pixels, the input image data including a first group of pixel values in a first color plane and a second group of pixel values in a second color plane, generated by a first portion and a second portion of the pixels respectively; determining a difference function associated with filter response values and target values, the filter response values being generated by utilizing characteristic filter coefficients to filter first and second estimated pixel values of estimated pixel data in the first and second color planes, respectively; determining a set of calibration filter coefficients by calculating a solution of the estimated pixel data, the solution resulting in a minimum value of the difference function; and filtering the input image data, by a filter circuit using the set of calibration filter coefficients, to calibrate the first group of pixel values.

20 Claims, 7 Drawing Sheets

(56) References Cited

U.S. PATENT DOCUMENTS

| | | | | |
|---|---|---|---|---|
| 2008/0259180 | A1* | 10/2008 | Ovsiannikov | H04N 9/04557 348/E9.051 |
| 2013/0070060 | A1* | 3/2013 | Chatterjee | H04N 5/2258 348/47 |
| 2013/0321679 | A1* | 12/2013 | Lim | H04N 9/04557 348/E9.053 |
| 2014/0078349 | A1* | 3/2014 | Velichko | H04N 5/357 348/241 |
| 2014/0267890 | A1* | 9/2014 | Lelescu | G02B 3/0056 348/373 |
| 2015/0146038 | A1* | 5/2015 | Donohoe | H04N 5/3572 348/251 |
| 2017/0318240 | A1* | 11/2017 | Yu | G06V 10/42 |
| 2018/0040105 | A1 | 2/2018 | Li et al. | |

OTHER PUBLICATIONS

English Abstract of CN109642823A.

Course Handouts of EE398 "Image and Video Compression" [last modified on Feb. 8, 2012] Retrieved from the course webpage using Internet <URL: https://web.stanford.edu/class/ee398a/handouts/lectures/07-TransformCoding.pdf>.

McCleary, Brent. Cross-talk correction methodology for color CMOS imagers, In: Digital Photography. International Society for Optics and Photonics, 2005. p. 117-128.

Getman, Alexander, et al. Crosstalk, color tint and shading correction for small pixel size image sensor. In: International Image Sensor Workshop, 2007, p. 166-169.

Wang, Ching-Chun, A study of CMOS technologies for image sensor applications. 2001. PhD Thesis. Massachusetts Institute of Technology.

Lectures on Digital Photography. Retrieved from the webpage using Internet <URL: https://www.eecis.udel.edu/~arce/files/Courses/DigImgProc/sensors-13apr16.key.pdf>.

Technical Application note "Calibrating to Reduce Horizontal Line Artifact". Retrieved from the webpage using Internet <URL: https://www.flir.asia/globalassets/support/iis/application-notes/tan2012002_calibrating_horizontal_line_artifact.pdf>.

Course Handouts of "Computational Photography". Retrieved from the webpage using Internet <URL: https://cs.nyu.edu/~fergus/teaching/comp_photo/4_image_pyramids.pdf>.

Blanksby, Andrew J.; Loinaz, Marc J. Performance analysis of a color CMOS photogate image sensor. IEEE Transactions on Electron Devices, 2000, 47.1: 55-64.

US10346955B2 is the counterpart to CN107734211A.

Office action issued by the China Patent Office dated Aug. 9, 2022 for counterpart 202010075937.0.

English abstract translation of the Office action issued by the China Patent Office dated Aug. 9, 2022 for counterpart 202010075937.0.

* cited by examiner

| {R} | {T} |
|---|---|
| $R_{smooth,g0} = M_{smooth} \begin{bmatrix} G_0'(0) \\ \vdots \\ G_0'(24) \end{bmatrix} \approx \begin{bmatrix} 0 \\ \vdots \\ 0 \end{bmatrix}$ | $T_{smooth,g0}$ |
| $R_{smooth,g1} = M_{smooth} \begin{bmatrix} G_1'(0) \\ \vdots \\ G_1'(24) \end{bmatrix} \approx \begin{bmatrix} 0 \\ \vdots \\ 0 \end{bmatrix}$ | $T_{smooth,g1}$ |
| $R_{struct} = M_{struct} \left( \begin{bmatrix} G_0'(0) \\ \vdots \\ G_0'(24) \end{bmatrix} - \begin{bmatrix} G_1'(0) \\ \vdots \\ G_1'(24) \end{bmatrix} \right) \approx \begin{bmatrix} 0 \\ \vdots \\ 0 \end{bmatrix}$ | $T_{struct}$ |
| $R_{subraw,g0} = M_{subraw,g0} \begin{bmatrix} G_0'(0) \\ \vdots \\ G_0'(24) \end{bmatrix} \approx [G_{0,subraw}]$ | $T_{subraw,g0}$ |
| $R_{subraw,g1} = M_{subraw,g1} \begin{bmatrix} G_1'(0) \\ \vdots \\ G_1'(24) \end{bmatrix} \approx [G_{1,subraw}]$ | $T_{subraw,g1}$ |
| $R_{approx} = M_{approx} \begin{bmatrix} G_0'(0) \\ \vdots \\ G_0'(24) \end{bmatrix} \approx [G_{0,sub}''] = \begin{bmatrix} G_0''(6) \\ G_0''(8) \\ G_0''(16) \\ G_0''(18) \end{bmatrix}$ | $T_{approx}$ |

FIG. 3

$$M_{subraw,g0} = \begin{bmatrix} 1 & 0 & 0 & 0 & \cdots & 0 & 0 \\ 0 & 0 & 0 & 0 & \cdots & 0 & 0 \\ 0 & 1 & 0 & 0 & \cdots & 0 & 0 \\ 0 & 0 & 0 & 0 & \cdots & 0 & 0 \\ 0 & 0 & 1 & 0 & \cdots & 0 & 0 \\ \vdots & \vdots & \vdots & \vdots & \cdots & \vdots & \vdots \\ 0 & 0 & 0 & 0 & \cdots & 1 & 0 \\ 0 & 0 & 0 & 0 & \cdots & 0 & 0 \\ 0 & 0 & 0 & 0 & \cdots & 0 & 1 \end{bmatrix}_{9 \times 25}$$

$$M_{subraw,g1} = M_{approx} = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ \vdots & \vdots & \vdots & \vdots \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}_{4 \times 25}$$

FIG. 4

$\Rightarrow \min(fd)$ $$\Rightarrow \min(\sqrt{\lambda_{sm}} \left\| M_{smooth} \begin{bmatrix} G_0'(0) \\ \vdots \\ G_0'(24) \end{bmatrix} - \begin{bmatrix} 0 \\ \vdots \\ 0 \end{bmatrix} \right\|^2 + \sqrt{\lambda_{sm}} \left\| M_{smooth} \begin{bmatrix} G_1'(0) \\ \vdots \\ G_1'(24) \end{bmatrix} - \begin{bmatrix} 0 \\ \vdots \\ 0 \end{bmatrix} \right\|^2$$

$$+ \sqrt{\lambda_{st}} \left\| M_{struct} \left( \begin{bmatrix} G_0'(0) \\ \vdots \\ G_0'(24) \end{bmatrix} - \begin{bmatrix} G_1'(0) \\ \vdots \\ G_1'(24) \end{bmatrix} \right) - \begin{bmatrix} 0 \\ \vdots \\ 0 \end{bmatrix} \right\|^2$$

$$+ \sqrt{\lambda_{fit}} \left\| M_{subraw,g0} \begin{bmatrix} G_0'(0) \\ \vdots \\ G_0'(24) \end{bmatrix} - [G_{0,subraw}] \right\|^2 + \sqrt{\lambda_{fit}} \left\| M_{subraw,g1} \begin{bmatrix} G_1'(0) \\ \vdots \\ G_1'(24) \end{bmatrix} - [G_{1,subraw}] \right\|^2$$

$$+ \sqrt{\lambda_{app}} \left\| M_{approx} \begin{bmatrix} G_0'(0) \\ \vdots \\ G_0'(24) \end{bmatrix} - \begin{bmatrix} G_0''(6) \\ G_0''(8) \\ G_0''(16) \\ G_0''(18) \end{bmatrix} \right\|^2 )$$

$$\Rightarrow \begin{bmatrix} \sqrt{\lambda_{sm}} M_{smooth} & 0 \\ 0 & \sqrt{\lambda_{sm}} M_{smooth} \\ \sqrt{\lambda_{st}} M_{struct} & -\sqrt{\lambda_{st}} M_{struct} \\ \sqrt{\lambda_{fit}} M_{subraw,g0} & 0 \\ 0 & \sqrt{\lambda_{fit}} M_{subraw,g1} \\ \sqrt{\lambda_{app}} M_{approx} & 0 \end{bmatrix} \begin{bmatrix} G_0'(0) \\ \vdots \\ G_0'(24) \\ G_1'(0) \\ \vdots \\ G_1'(24) \end{bmatrix} = \begin{bmatrix} 0 \\ 0 \\ 0 \\ G_{0,subraw} \\ G_{1,subraw} \\ G_{0,sub}'' \end{bmatrix} \Rightarrow UG = V \Rightarrow U^T UG = U^T V$$

$$\Rightarrow G = (U^T U)^{-1} U^T V = FV \Rightarrow \begin{bmatrix} G_0'(0) \\ \vdots \\ G_0'(12) \\ \vdots \\ G_0'(24) \\ G_1'(0) \\ \vdots \\ G_1'(12) \\ \vdots \\ G_1'(24) \end{bmatrix} = FV = \begin{bmatrix} f_{0,g0} \\ \vdots \\ f_{12,g0} \\ \vdots \\ f_{24,g0} \\ f_{0,g1} \\ \vdots \\ f_{12,g1} \\ \vdots \\ f_{24,g1} \end{bmatrix} V$$

PIXEL VALUE CALIBRATION METHOD AND PIXEL VALUE CALIBRATION DEVICE

BACKGROUND

The present disclosure relates to image processing and, more particularly, to methods and devices utilizing a filter circuit to perform pixel value calibration.

An image sensor can capture different color information with the use of color filters. For example, a complementary metal-oxide-semiconductor image sensor (CMOS image sensor) using a Bayer color filter array can have red, green and blue channels, wherein each pixel can provide color information on one of the red (R), green (G) and blue (B) channels. A full-color image can be reconstructed using image interpolation/demosaicing according to color information of each channel.

However, pixel crosstalk can seriously affect the result of image interpolation/demosaicing. For example, the number of green filters is twice the number of red filters and the number of blue filters in a Bayer color filter array. A green pixel, on the right and left sides of which red pixels are located, is disposed in correspondence with to a green filter and can be referred to as a Gr pixel, wherein each of the red pixels is disposed in correspondence with to a red filter and can be referred to as an R pixel. A green pixel, on the right and left sides of which blue pixels are located, is disposed in correspondence with to a green filter and can be referred to as a Gb pixel, wherein each of the blue pixels is disposed in correspondence with to a blue filter and can be referred to as a B pixel. As pixel crosstalk experienced by the Gr pixel differs from that experienced by the Gb pixel, respective color information provided by these two green pixels would indicate different intensities of interference, thus resulting in Gb-Gr imbalance and degraded image quality.

Thus, there is a need for an image processing scheme to address the issue of Gb-Gr imbalance.

SUMMARY

The described embodiments provide methods and devices utilizing a filter circuit to perform pixel value calibration.

Some embodiments described herein include a pixel value calibration method. The pixel value calibration method includes: obtaining input image data generated by a plurality of pixels, wherein the input image data includes a first group of pixel values in a first color plane outputted by a first portion of the pixels, and a second group of pixel values in a second color plane outputted by a second portion of the pixels; determining a difference function associated with a plurality of groups of filter response values of estimated image data and a plurality of groups of target values, wherein the estimated image data includes a plurality of first estimated pixel values for the pixels in the first color plane and a plurality of second estimated pixel values for the pixels in the second color plane, the groups of filter response values are generated by utilizing a plurality of sets of characteristic filter coefficients to filter the first estimated pixel values and the second estimated pixel values, and an anticipated pixel value of each pixel in the second portion of the pixels in the first color plane serves as a first group of target values in the groups of target values; determining at least one set of calibration filter coefficients by calculating a solution of the estimated image data, wherein the solution results in a minimum value of the difference function; and filtering the input image data, by a filter circuit using the at least one set of calibration filter coefficients, to calibrate the first group of pixel values.

Some embodiments described herein include a pixel value calibration device. The pixel value calibration device includes a calculation module and a filter circuit. The calculation module is configured to: obtain input image data generated by a plurality of pixels, wherein the input image data comprises a first group of pixel values in a first color plane outputted by a first portion of the pixels, and a second group of pixel values in a second color plane outputted by a second portion of the pixels; determine a difference function associated with a plurality of groups of filter response values of estimated image data and a plurality of groups of target values, wherein the estimated image data comprises a plurality of first estimated pixel values for the pixels in the first color plane and a plurality of second estimated pixel values for the pixels in the second color plane; the groups of filter response values are generated by utilizing a plurality of sets of characteristic filter coefficients to filter the first estimated pixel values and the second estimated pixel values; an anticipated pixel value of each pixel in the second portion of the pixels in the first color plane serves as a first group of target values in the groups of target values; and determine at least one set of calibration filter coefficients by calculating a solution of the estimated image data, the solution resulting in a minimum value of the difference function. The filter circuit, coupled to the calculation module, is configured to use the at least one set of calibration filter coefficients to filter the input image data to calibrate the first group of pixel values.

BRIEF DESCRIPTION OF THE DRAWINGS

Aspects of the present disclosure are best understood from the following detailed description when read with the accompanying figures. It should be noted that, in accordance with the standard practice in the field, various features are not drawn to scale. In fact, the dimensions of the various features may be arbitrarily increased or reduced for clarity of discussion.

FIG. 4 is a diagram illustrating implementations of the sets of characteristic filter coefficients shown in FIG. 3 in accordance with some embodiments of the present embodiment.

FIG. 5 is a diagram illustrating an implementation of a difference function determined according to each group of filter response values and a corresponding group of target values shown in FIG. 3 in accordance with some embodiments of the present disclosure.

DETAILED DESCRIPTION

The following disclosure provides various embodiments or examples for implementing different features of the present disclosure. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present. In addition, repeat reference numerals and/or letters may be repeated in various examples of the present. This repetition is for the purpose of simplicity and clarity and does not in itself dictate a relationship between the various embodiments and/or configurations discussed. Furthermore, as could be appreciated, the present embodiments provide many ideas that can be widely applied in various scenarios. The following embodiments are provided for illustration purposes, and shall not be used to limit the scope of the present disclosure.

With the use of suitable/optimal filter design, the proposed pixel value calibration scheme can reconstruct color plane(s) according to real-time image data while keeping respective pattern features of different color planes, such as a Gb plane and a Gr plane, and estimate a pixel value difference or a pixel value correction amount between different color planes to thereby perform pixel value calibration. Further description is provided below.

Figure 1:
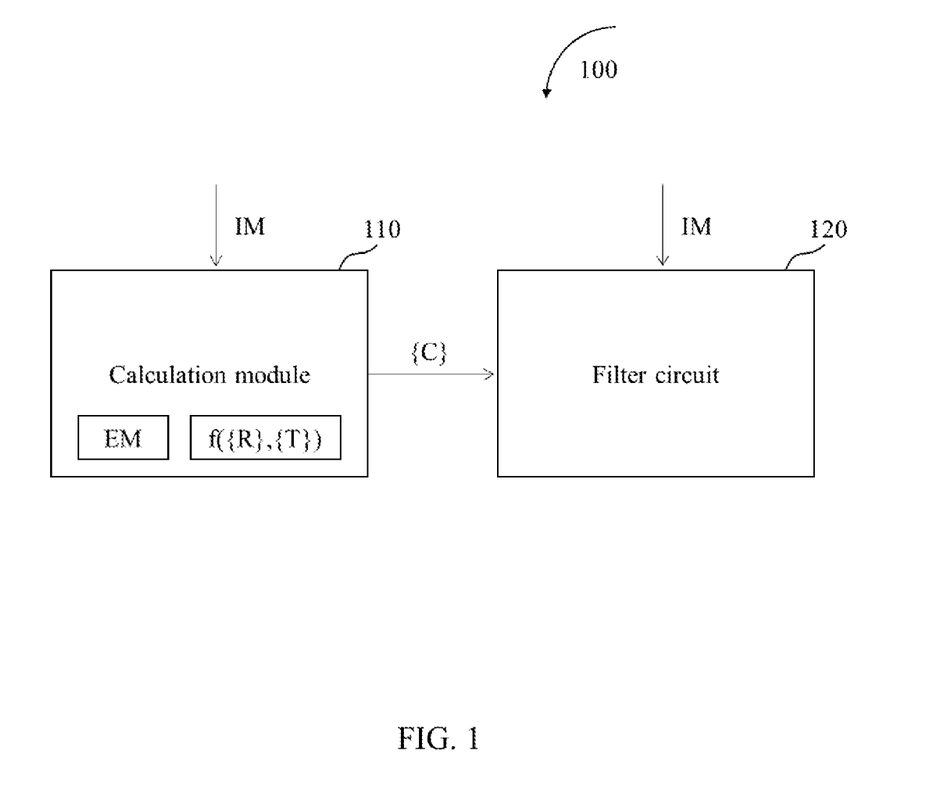
FIG. 1 is a block diagram illustrating an exemplary pixel value calibration device in accordance with some embodiments of the present disclosure.

FIG. 1 is a block diagram illustrating an exemplary pixel value calibration device in accordance with some embodiments of the present disclosure. The pixel value calibration device 100 can be implemented as, but is not limited to, a circuit chip for use in an imaging system, a display system or an image processing system. In the present embodiment, the pixel value calibration device 100 can be configured to filter input image data IM generated by a plurality of pixels (not shown in FIG. 1) to thereby calibrate a pixel value included in the input image data IM.

The pixel value calibration device 100 may include, but is not limited to, a calculation module 110 and a filter circuit 120. The calculation module 110 is configured to obtain the input image data IM, and determine at least one portion of a plurality of groups of target values {T} according to the input image data IM. In addition, the calculation module 110 can be configured to determine a difference function f({R}, {T}) associated with a plurality of groups of filter response values {R} of estimated image data EM and a plurality of groups of target values {T}. By calculating a solution of the estimated image data EM, which makes the difference function f({R},{T}) to satisfy a pre-determined condition, the calculation module 110 can be configured to determine at least one set of calibration filter coefficients {C}. For example, the calculation module 110 can determine the at least one set of calibration filter coefficients {C} by calculating a solution of the estimated image data EM which results in a minimum value of the difference function f({R},{T}).

The filter circuit 120, coupled to the calculation module 110, is configured to filter the input image data IM according to the at least one set of calibration filter coefficients {C}, and accordingly calibrate pixel value(s) of at least one portion of the input image data IM. For example, when employed to process the Gr-Gb imbalance, the filter circuit 120 can be configured to reconstruct at least one of a Gr plane and a Gb plane according to the at least one set of calibration filter coefficients {C}, and calibrate pixel value(s) outputted by at least one of a Gr pixel and a Gb pixel included in the input image data IM according to a pixel value difference between the Gr plane and the Gb plane.

Figure 2:
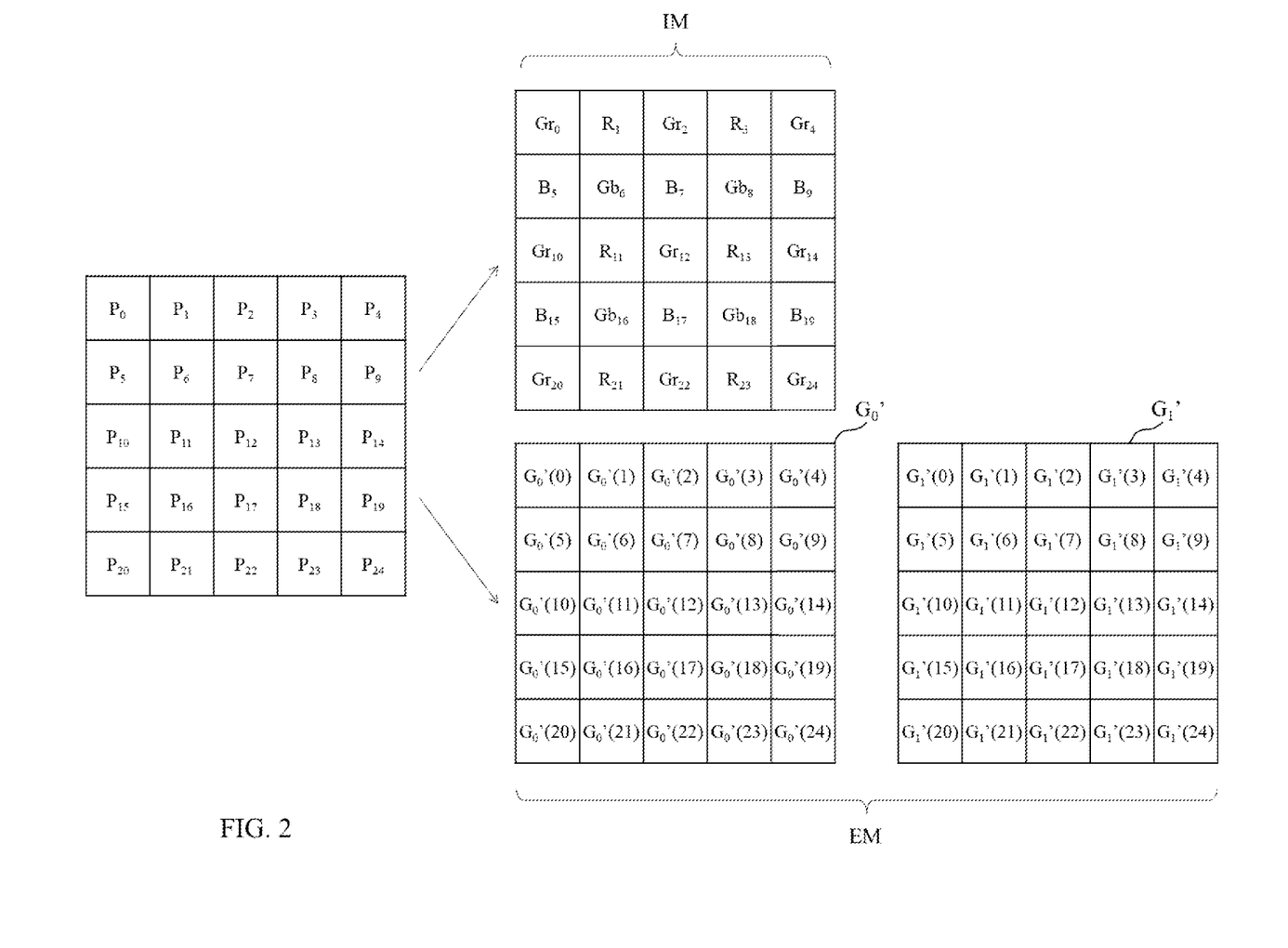
FIG. 2 is a diagram illustrating an implementation of the input image data shown in FIG. 1 in accordance with some embodiments of the present disclosure.

FIG. 2 is a diagram illustrating an implementation of the input image data IM shown in FIG. 1 in accordance with some embodiments of the present disclosure. In the present embodiment, the input image data IM includes a plurality of pixel values outputted by a plurality of pixels $P_0$-$P_{24}$, wherein the pixels $P_0$-$P_{24}$ can be disposed in correspondence with the design of the Bayer color filter array and arranged in a pixel array of 5 rows and 5 columns. A plurality of pixels $P_1$, $P_3$, $P_{11}$, $P_{13}$, $P_{21}$ and $P_{23}$, each referred to as an R pixel, are configured to provide color information on a red channel, and output a plurality of pixel values $R_1$, $R_3$, $R_{11}$, $R_{13}$, $R_{21}$ and $R_{23}$ in a color plane, i.e. an R plane, respectively. A plurality of pixels $P_5$, $P_7$, $P_9$, $P_{15}$, $P_{17}$ and $P_{19}$, each referred to as a B pixel, are configured to provide color information on a blue channel, and output a plurality of pixel values $B_5$, $B_7$, $B_9$, $B_{15}$, $B_{17}$ and $B_{19}$ in a color plane, i.e. a B plane, respectively.

Additionally, a plurality of pixels $P_0$, $P_2$, $P_4$, $P_6$, $P_8$, $P_{10}$, $P_{12}$, $P_{14}$, $P_{16}$, $P_{18}$, $P_{20}$, $P_{22}$ and $P_{24}$ are configured to provide color information on a green channel. The pixels $P_0$, $P_2$, $P_4$, $P_{10}$, $P_{12}$, $P_{14}$, $P_{20}$, $P_{22}$ and $P_{24}$, arranged in a same row as an R pixel and referred to as Gr pixels, are configured to output a plurality of pixel values $Gr_0$, $Gr_2$, $Gr_4$, $Gr_{10}$, $Gr_{12}$, $Gr_{14}$, $Gr_{20}$, $Gr_{22}$ and $Gr_{24}$ in a color plane, i.e. a Gr plane, respectively. The pixels $P_6$, $P_8$, $P_{16}$ and $P_{18}$, arranged in a same row as a B pixel and referred to as Gb pixels, are configured to output a plurality of pixel values $Gb_6$, $Gb_8$, $Gb_{16}$ and $Gb_{18}$ in a color plane, i.e. a Gb plane, respectively.

To facilitate understanding of the present disclosure, the proposed pixel value calibration scheme is described with reference to the following embodiments where a Gr plane and a Gb plane are reconstructed to calibrate pixel values outputted by a Gr pixel and a Gb pixel. However, this is not intended to limit the scope of the present disclosure. For example, the proposed pixel value calibration scheme can be employed in embodiments where at least one color plane is reconstructed to estimate a pixel value, or a pixel value calibration amount, between different color planes to thereby perform pixel value calibration. Such modifications and alternatives also fall within the spirit and the scope of the present disclosure.

Referring to FIG. 2 and also to FIG. 1, after obtaining the input image data IM, the calculation module 110 can be configured to determine a plurality of groups of target values {T} according to the input image data IM. The groups of target values {T} can indicate image characteristics which a reconstructed color plane, such as the Gr plane or the Gb plane, is expected to have. For example, if it is expected that the reconstructed Gr plane can exhibit a detailed texture characteristic, the groups of target values {T} may include an anticipated pixel value of a Gb pixel in the Gr plane. As a result, in the reconstructed Gr plane, pixel values corresponding to adjacent columns of pixels, or adjacent rows of pixels, can be expected to indicate brightness variations between the columns of pixels or the rows of pixels.

Moreover, the calculation module 110 can be configured to use a plurality of sets of characteristic filter coefficients to filter the estimated image data EM to generate a plurality of groups of filter response values {R}, thereby determining the difference function $f(\{R\},\{T\})$ associated with the groups of filter response values $\{R\}$ and the groups of target values $\{T\}$.

In the present embodiment, the estimated image data EM may include a plurality of estimated pixel values $G_0'(0)$-$G_0'(24)$ for the pixels $P_0$-$P_{24}$ in a color plane $G_0'$ and a plurality of estimated pixel values $G_1'(0)$-$G_1'(24)$ for the pixels $P_0$-$P_{24}$ in a color plane $G_1'$. One of the color plane $G_0'$ and the color plane $G_1'$ can be the Gr plane, and the other of the color plane $G_0'$ and the color plane $G_1'$ can be the Gb plane. For example, in some cases where a pixel of interest of the pixels $P_0$-$P_{24}$ is a Gr pixel, the color plane $G_0'$ is the Gr plane while the color plane $G_1'$ is the Gb plane. Respective pixel values of the pixel of interest in the color plane $G_0'$ and in the color plane $G_1'$ can be used to estimate a pixel value difference/deviation between the color plane $G_0'$ and the color plane $G_1'$. As another example, in some cases where the pixel of interest is a Gb pixel, the color plane $G_0'$ is the Gb plane while the color plane $G_1'$ is the Gr plane. In the present embodiment, the pixel of interest can be, but is not limited to, a center pixel of the pixels $P_0$-$P_{24}$. As a result, the color plane $G_0'$ and the color plane $G_1'$ can be the Gr plane and the Gb plane, respectively.

Figure 3:
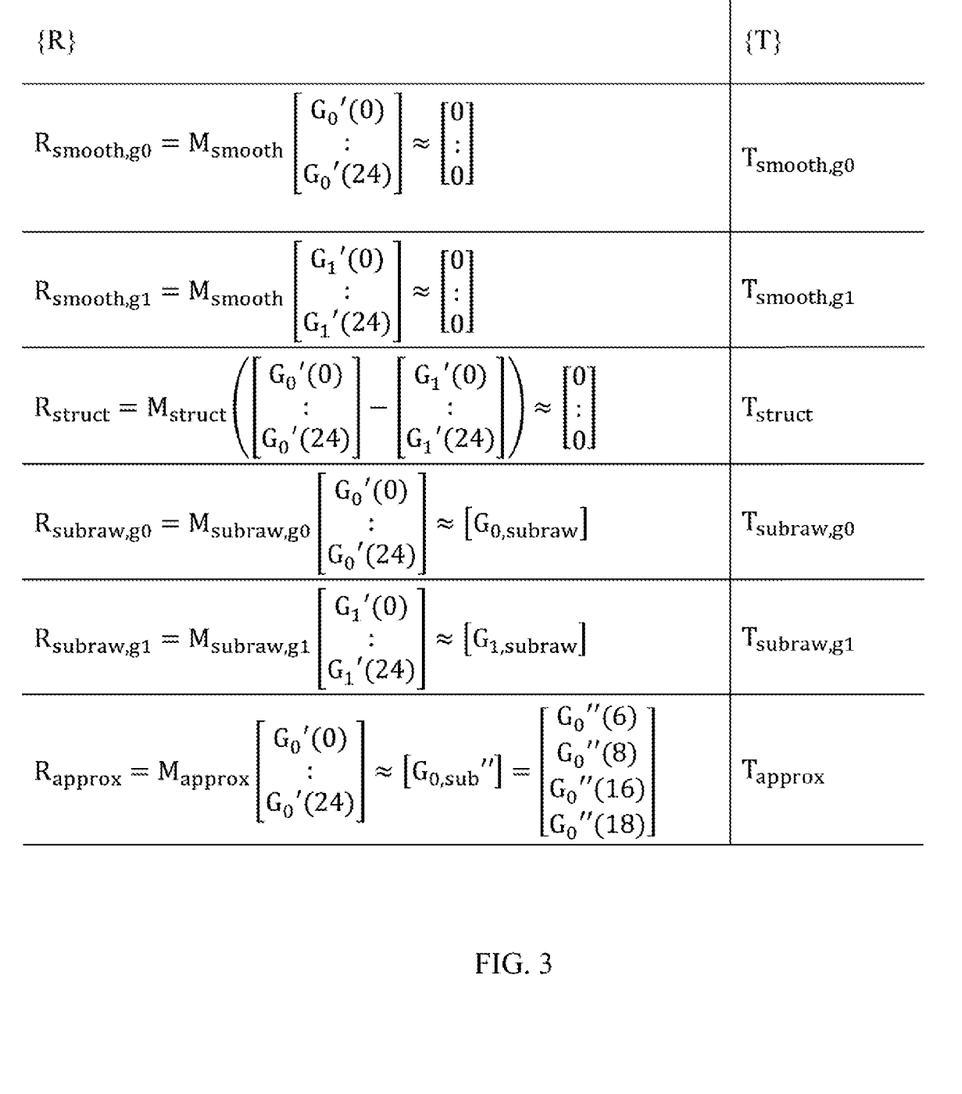
FIG. 3 illustrates implementations of the sets of characteristic filter coefficients used for filtering the estimated pixel values shown in FIG. 2 in accordance with some embodiments of the present disclosure.

The sets of characteristic filter coefficients can be designed according to image characteristics which an reconstructed color plane is expected to have, such that the groups of filter response values $\{R\}$ can be close to or substantially equal to the groups of target values $\{T\}$. Referring to FIG. 3 and also to FIG. 2, implementations of the sets of characteristic filter coefficients used for filtering the estimated pixel values $G_0'(0)$-$G_0'(24)$ and $G_1'(0)$-$G_1'(24)$ shown in FIG. 2 are illustrated in FIG. 3 in accordance with some embodiments of the present disclosure. In the present embodiment, in order to obtain a reconstructed Gr plane and Gb plane with image characteristics including, but not limited to, image smoothness, structure similarity, data consistency and detailed texture, the groups of target values $\{T\}$ may include a plurality of groups of target values $T_{smooth,g0}$ and $T_{smooth,g1}$ indicating the image smoothness, a group of target values $T_{struct}$ indicating the structure similarity, a plurality of groups of target values $T_{subraw,g0}$ and $T_{subraw,g1}$ indicating the data consistency, and a group of target values $T_{approx}$ indicating texture detail. In addition, a plurality of sets of characteristic filter coefficients $M_{smooth}$, $M_{struct}$, $M_{subraw,g0}$, $M_{subraw,g1}$ and $M_{approx}$ can be used to filter the estimated pixel values $G_0'(0)$-$G_0'(24)$ and $G_1'(0)$-$G_1'(24)$ to generate a plurality of groups of filter response values $R_{smooth,g0}$, $R_{smooth,g1}$, $R_{struct}$, $R_{subraw,g0}$, $R_{subraw,g1}$ and $R_{approx}$, which can represent an embodiment of the groups of filter response values $\{R\}$ shown in FIG. 1. Some embodiments of each group of filter response values and the corresponding group of target values are discussed below. It is worth noting that as image filtering operation can be implemented by using filter coefficients, e.g. a convolution kernel, to perform a convolution upon pixel values, the groups of filter response values $\{R\}$ can be expressed by matrix multiplications, which can represent convolution operation, in the embodiment shown in FIG. 3 for illustrative purposes. In the present embodiment, the estimated pixel values $G_0'(0)$-$G_0'(24)$ can be vectorized into a 25×1 column vector, and the estimated pixel values $G_1'(0)$-$G_1'(24)$ can be vectorized into a 25×1 column vector.

The image smoothness refers to the fact that natural images usually do not have extremely high frequency components but have good signal continuity to exhibit relatively smooth characteristics. As a result, it can be expected that the reconstructed Gr plane and Gb plane do not have extremely high frequency components. For example, a high frequency component of the input image data IM in the color plane $G_0'$ can be used to determine the group of target values $T_{smooth,g0}$. The set of characteristic filter coefficients $M_{smooth}$ can be used to perform high-pass filtering on the estimated pixel values $G_0'(0)$-$G_0'(24)$ in the color plane $G_0'$, such that the group of filter response values $R_{smooth,g0}$ can reflect a high frequency component of the estimated image data EM in the color plane $G_0'$. In other words, the set of characteristic filter coefficients $M_{smooth}$ can be implemented using a high-pass filter coefficient matrix, such as a 25×25 filter coefficient matrix. In a case where the estimated image data EM has no or almost no high frequency component in the color plane $G_0'$, the group of target values $T_{smooth,g0}$ can be equal to or approximately equal to zero, and the group of filter response values $R_{smooth,g0}$ can be expected to be equal to or approximately equal to zero.

Similarly, the group of target values $T_{smooth,g1}$ can be determined according to a high frequency component of the input image data IM in the color plane $G_1'$. The set of characteristic filter coefficients $M_{smooth}$ can be used to perform high-pass filtering on the estimated pixel values $G_1'(0)$-$G_1'(24)$ in the color plane $G_1'$, such that the group of filter response values $R_{smooth,g1}$ can reflect a high frequency component of the estimated image data EM in the color plane $G_1'$. In a case where the estimated image data EM in the color plane $G_1'$ has no or almost no high frequency component, the group of target values $T_{smooth,g1}$ can be equal to or approximately equal to zero, and the group of filter response values $R_{smooth,g1}$ can be expected to be equal to or approximately equal to zero.

It is worth noting that although the estimated pixel values $G_0'(0)$-$G_0'(24)$ in the color plane $G_0'$ and the estimated pixel values $G_1'(0)$-$G_1'(24)$ in the color plane $G_1'$ are filtered using the same set of characteristic filter coefficients $M_{smooth}$ in the embodiments described above, the estimated pixel values $G_0'(0)$-$G_0'(24)$ can be filtered using a set of characteristic filter coefficients different from that used to filter the estimated pixel values $G_1'(0)$-$G_1'(24)$ without departing from the scope of the present disclosure.

The structure similarity means that different reconstructed color planes can have similar structures. As a result, although a certain pixel value difference exists between the reconstructed Gr plane and the Gb plane, each of the reconstructed Gr plane and Gb plane can exhibit G channel texture characteristics associated with the pixels $P_0$-$P_{24}$. For each pixel, it can be expected that a difference between a structure characteristic of a corresponding estimated pixel value in the reconstructed Gr plane and a structure characteristic of a corresponding estimated pixel value in the reconstructed Gb plane will be quite small. For example, the group of target values $T_{struct}$ can be determined according to a change in a pixel value difference between a corresponding estimated pixel value in the color plane $G_0'$ and a corresponding estimated pixel value in the color plane $G_1'$ for each of the pixels $P_0$-$P_{24}$. The set of characteristic filter coefficients $M_{struct}$ can be used to perform high-pass filtering on the pixel value difference between the corresponding estimated pixel values in the color plane $G_0'$ and in the color plane $G_1'$, such that the group of filter response values $R_{struct}$ can reflect a change in a high frequency structure difference between the color plane $G_0'$ and the color plane $G_1'$ for the estimated image data EM. In other words, the set of characteristic filter coefficients $M_{struct}$ can be implemented using a high-pass filter coefficient matrix, such as 25×25 filtering coefficient matrix. In a case where the color plane $G_0'$ and the color plane $G_1'$ have the same or similar texture structures, the group of target values $T_{struct}$ can be equal to or approximately equal to zero, and the group of filter response values $R_{struct}$ can be expected to be equal to or approximately equal to zero.

The data consistency means that pixel values corresponding to the pixels $P_0$, $P_2$, $P_4$, $P_{10}$, $P_{12}$, $P_{14}$, $P_{20}$, $P_{22}$ and $P_{24}$ (Gr pixels) in the reconstructed Gr plane can be equal to or approximately equal to the pixel values $Gr_0$, $Gr_2$, $Gr_4$, $Gr_{10}$, $Gr_{12}$, $Gr_{14}$, $Gr_{20}$, $Gr_{22}$ and $Gr_{24}$ included in the input image data IM, respectively. Also, pixel values corresponding to the pixels $P_6$, $P_8$, $P_{16}$ and $P_{18}$ (Gb pixels) in the reconstructed Gb plane can be equal to or approximately equal to the pixel values $Gb_6$, $Gb_8$, $Gb_{16}$ and $Gb_{18}$ included in the input image data IM.

For example, in some embodiments where the color plane $G_0'$ and the color plane $G_1'$ are the Gr plane and the Gb plane respectively, the group of target values $T_{subraw,g0}$ can be determined according to the pixel values $Gr_0$, $Gr_2$, $Gr_4$, $Gr_{10}$, $Gr_{12}$, $Gr_{14}$, $Gr_{20}$, $Gr_{22}$ and $Gr_{24}$, and the group of target values $T_{subraw,g1}$ can be determined according to the pixel values $Gb_6$, $Gb_8$, $Gb_{16}$ and $Gb_{18}$. The set of characteristic filter coefficients $M_{subraw,g0}$ can be used to sample the respective estimated pixel values for the pixels $P_0$, $P_2$, $P_4$, $P_{10}$, $P_{12}$, $P_{14}$, $P_{20}$, $P_{22}$ and $P_{24}$ in the color plane $G_0'$, such that the group of filter response values $R_{subraw,g0}$ can reflect the corresponding pixel value of each Gr pixel in the color plane $G_0'$. In addition, the set of characteristic filter coefficients $M_{subraw,g1}$ can be used to sample the respective estimated pixel values for the pixels $P_6$, $P_8$, $P_{16}$ and $P_{18}$ in the color plane $G_1'$, such that the group of filter response values $R_{subraw,g1}$ can reflect the corresponding pixel value of each Gb pixel in the color plane $G_1'$.

In some embodiments, the pixel value of each Gr pixel in the input image data IM can directly serve as the group of target values $T_{subraw,g0}$, and the pixel value of each Gb pixel in the input image data IM can directly serve as the group of target values $T_{subraw,g1}$:

$$T_{subraw,g0} = [G_{0,subraw}] = \begin{bmatrix} Gr_0 \\ Gr_2 \\ Gr_4 \\ Gr_{10} \\ Gr_{12} \\ Gr_{14} \\ Gr_{20} \\ Gr_{22} \\ Gr_{24} \end{bmatrix};$$

and $$T_{subraw,g1} = [G_{1,subraw}] = \begin{bmatrix} Gr_6 \\ Gr_8 \\ Gr_{16} \\ Gr_{18} \end{bmatrix}.$$

The texture detail can reflect information regarding signal variations between columns of pixels, and/or information regarding signal variations between rows of pixels. By way of example but not limitation, during interpolation in image processing, pixel values in the Gr plane and the Gb plane can be considered as pixel information on a same color channel. As a result, pixel values of adjacent columns/rows of pixels in the reconstructed Gr plane, or the reconstructed Gb plane, can exhibit brightness variations or image textures associated with the columns/rows of pixels. For example, in some embodiments where the color plane $G_0'$ and the color plane $G_1'$ are the Gr plane and the Gb plane respectively, a group of anticipated pixel values $G_{0,sub}''$ of Gb pixels in the Gr plane, i.e. anticipated pixel values $G_0''(6)$, $G_0''(8)$, $G_0''(16)$ and $G_0''(18)$ respectively corresponding to the pixel values $Gb_6$, $Gb_8$, $Gb_{16}$ and $Gb_{18}$ in the present embodiment, can serve as the group of target values $T_{approx}$, such that the reconstructed the Gr plane can be expected to exhibit brightness variations between columns/rows of pixels. Additionally, the set of characteristic filter coefficients $M_{approx}$ can be used to sample the estimated pixel values $G_0'(6)$, $G_0'(8)$, $G_0'(16)$ and $G_0'(18)$ in the color plane $G_0'$, such that the group of filter response values $R_{approx}$ can reflect an estimated pixel value for each Gr pixel in the color plane $G_0'$.

It is worth noting that the anticipated pixel values $G_0''(6)$, $G_0''(8)$, $G_0''(16)$ and $G_0''(18)$ can be obtained according to various estimation techniques. For example, in some embodiments, the calculation module 110 shown in FIG. 1 can be configured to determine the anticipated pixel value $G_0''(6)$ according to the pixel value $Gb_6$ of the pixel $P_6$ in the Gb plane and the pixel values $Gr_0$, $Gr_2$, $Gr_{10}$ and $Gr_{12}$ of the four pixels $P_0$, $P_2$, $P_{10}$ and $P_{12}$ surrounding the pixel $P_6$ in the Gr plane. By way of example but not limitation, the calculation module 110 shown in FIG. 1 can use one of $(Gr_0+Gr_2)/2$, $(Gr_{10}+Gr_{12})/2$, $(Gr_0+Gr_{10})/2$ and $(Gr_2+Gr_{12})/2$, which is closest to the pixel value $Gb_6$, as the anticipated pixel value $G0''(6)$.

FIG. 4 is a diagram illustrating implementations of the sets of characteristic filter coefficients $M_{subraw,g0}$, $M_{subraw,g1}$ and $M_{approx}$ shown in FIG. 3 in accordance with some embodiments of the present embodiment. In the present embodiment, the sets of characteristic filter coefficients $M_{subraw,g0}$, $M_{subraw,g1}$ and $M_{approx}$ can be used to perform hop sampling or undersampling on the estimated image data EM shown in FIG. 2. For example, in some embodiments where the color plane $G_0'$ and color plane $G_1'$ shown in FIG. 2 are the Gr plane and the Gb plane respectively, the set of characteristic filter coefficients $M_{subraw,g0}$ can be implemented using a 9×25 sampling matrix so as to sample the estimated pixel values $G_0'(0)$, $G_0'(2)$, $G_0'(4)$, $G_0'(10)$, $G_0'(12)$, $G_0'(14)$, $G_0'(20)$, $G_0'(22)$ and $G_0'(24)$. The set of characteristic filter coefficients $M_{subraw,g1}$ can be implemented using a 4×25 sampling matrix so as to sample the estimated pixel values $G_1'(6)$, $G_1'(8)$, $G_1'(16)$ and $G_1'(18)$. In addition, the set of characteristic filter coefficients $M_{approx}$ can be implemented using a 4×25 sampling matrix so as to obtain sampling values corresponding to the anticipated estimated pixel values $G_0''(6)$, $G_0''(8)$, $G_0''(16)$ and $G_0''(18)$.

FIG. 5 is a diagram illustrating an implementation of a difference function determined according to each group of filter response values and a corresponding group of target values shown in FIG. 3 in accordance with some embodiments of the present disclosure. The difference function f({R},{T}) shown in FIG. 1 can be implemented using the difference function fd shown in FIG. 5. In the present embodiment, the difference function fd can be implemented using a weighted squared deviation between the groups of filter response values $R_{smooth,g0}$, $R_{smooth,g1}$, $R_{struct}$, $R_{subraw,g0}$, $R_{subraw,g1}$ and $R_{approx}$ and the groups of target values $T_{smooth,g0}$ and $T_{smooth,g1}$, $T_{struct}$, $T_{subraw,g0}$, $T_{subraw,g1}$ and $T_{approx}$, wherein $\sqrt{\lambda_{sm}}$, $\sqrt{\lambda_{st}}$, $\sqrt{\lambda_{fit}}$ and $\sqrt{\lambda_{app}}$ are weights respectively corresponding to the image smoothness, the structure similarity, the data consistency and the texture detail. For example, when filtering operation is performed upon input image data captured in a low light environment, the weight of the image smoothness, i.e. $\sqrt{\lambda_{sm}}$, can be increased to reduce influence of noise on output image data.

In the present embodiment, a solution of the estimated pixel values $G_0'(0)$-$G_0'(24)$ and $G_1'(0)$-$G_1'(24)$, i.e. the estimated image data EM shown in FIG. 2, can be calculated using a least squares method to thereby determine at least one set of the solution calibration filter coefficients used by the filter circuit 120 shown in FIG. 1. The solution of the estimated pixel values $G_0'(0)$-$G_0'(24)$ and $G_1'(0)$-$G_1'(24)$ can result in a minimum value of the difference function fd, which is expressed by min(fd). For example, the groups of filter response values $R_{smooth,g0}$, $R_{smooth,g1}$, $R_{struct}$, $R_{subraw,g0}$, $R_{subraw,g1}$ and $R_{approx}$ can be expressed as a data matrix U (e.g. a 92×50 matrix) multiplied by an estimated vector G (e.g. a 50×1 matrix), wherein the data matrix U is associated with the sets of characteristic filter coefficients $M_{smooth}$, $M_{struct}$, $M_{subraw,g0}$, $M_{subraw,g1}$ and $M_{approx}$, and the estimated vector G is associated with the estimated pixel values $G_0'(0)$-$G_0'(24)$ and $G_1'(0)$-$G_1'(24)$. The groups of target values $T_{smooth,g0}$, $T_{smooth,g1}$, $T_{struct}$, $T_{subraw,g0}$, $T_{subraw,g1}$ and $T_{approx}$ can be expressed as a target vector V (e.g. a 92×1 column matrix). As a result, the solution of the estimated pixel values $G_0'(0)$-$G_0'(24)$ and $G_1'(0)$-$G_1'(24)$ that results in the minimum value of the difference function fd can be expressed as a product of a matrix $(U^TU)^{-1}$, a matrix $U^T$ and the target vector V. The matrix $U^T$ is a transposed matrix of the data matrix U, and the matrix $(U^TU)^{-1}$ is an inverse matrix of a product of the matrix $U^T$ and the data matrix U. At least one set of calibration filter coefficients can be determined according to the product of the matrix $(U^TU)^{-1}$ and the matrix $U^T$. For example, the product of the matrix $(U^TU)^{-1}$ and the matrix $U^T$ can serve as a filter matrix F, wherein $f_{0,g0}$-$f_{24,g0}$ represent row vectors of the 1$^{st}$ row to the 25$^{th}$ row of the filter matrix F respectively, and $f_{0,g1}$-$f_{24,g1}$ represent row vectors of the 26$^{th}$ row to the 50$^{th}$ row of the filter matrix F respectively. As each of the filter matrix F and the target vector V is known, the color plane $G_0'$ and the color plane $G_1'$ can be reconstructed according to the filter matrix F and the target vector V, thereby calibrating a pixel value of a pixel of interest of the pixels $P_0$-$P_{24}$ shown in FIG. 2.

Figure 6:
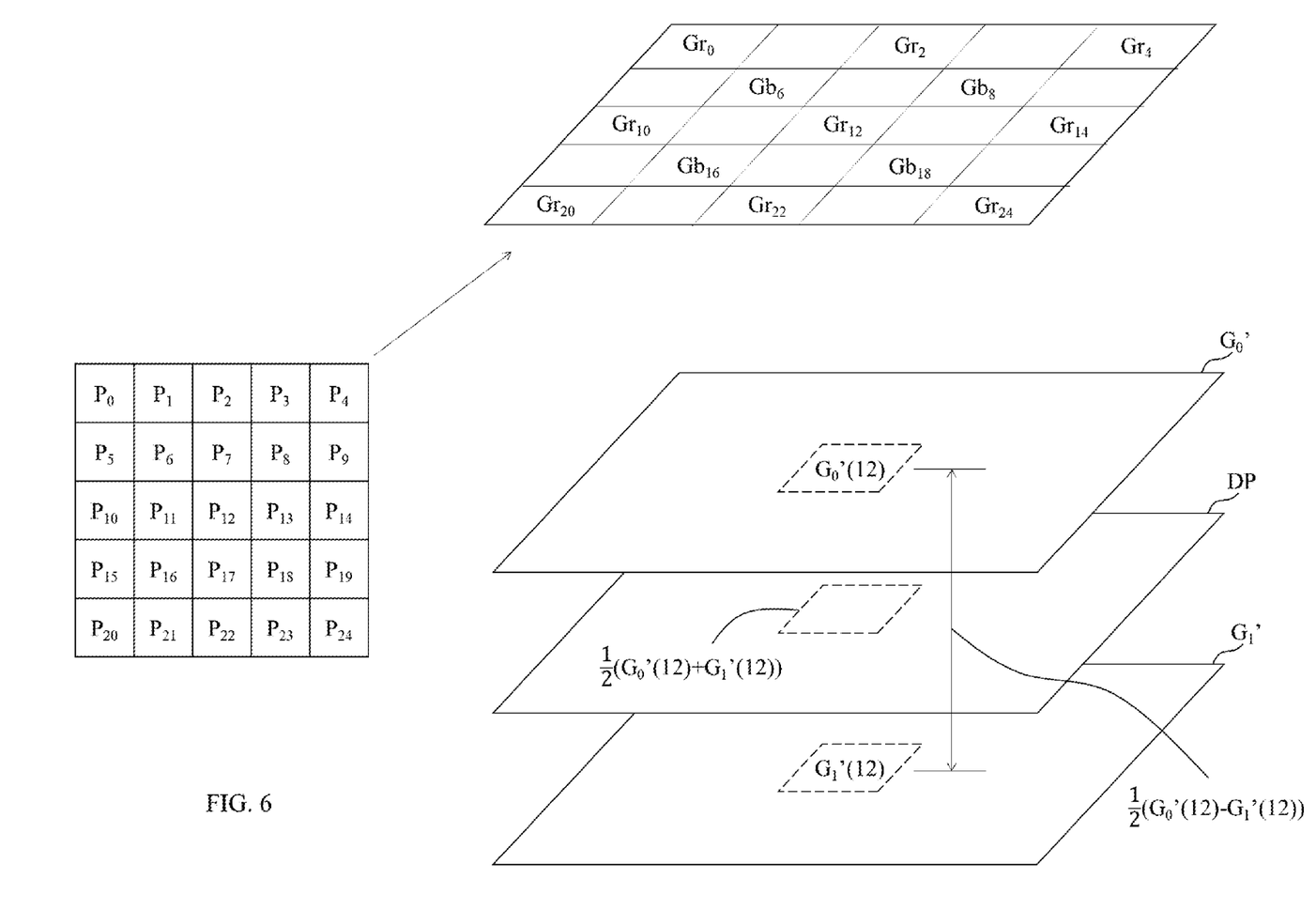
FIG. 6 is a diagram illustrating implementations of the color planes shown in FIG. 2 reconstructed according to the filter matrix and the target vector shown in FIG. 5 in accordance with some embodiments of the present embodiment.

FIG. 6 is a diagram illustrating implementations of the color plane $G_0'$ and the color plane $G_1'$ shown in FIG. 2 reconstructed according to the filter matrix F and the target vector V shown in FIG. 5 in accordance with some embodiments of the present embodiment. Referring to FIG. 6 and also to FIG. 1 and FIG. 5, the color plane $G_0'$ and the color plane $G_1'$ can correspond to, but are not limited to, the Gr plane and the Gb plane respectively in the present embodiment. The respective pixel values of each Gr pixel and each Gb pixel can be calibrated to a data plane DP. For example, in some embodiments where the pixel $P_{12}$, i.e. the center pixel of the pixels $P_0$-$P_{24}$, is a pixel of interest, the estimated pixel value $G_0'(12)$ of the pixel $P_{12}$ in the color plane $G_0'$ can be expressed as $f_{12,g0}$ V, and the estimated pixel value $G_1'(12)$ of the pixel $P_{12}$ in the color plane $G_1'$ can be expressed as $f_{12,g1}$ V. A pixel value difference between the Gr plane and the Gb plane for the pixel $P_{12}$ can be expressed as $(f_{12,g0}$-$f_{12,g1})$ V. In some cases where a pixel value correction amount for the pixel value $Gr_{12}$ of the pixel $P_{12}$ is equal to half of the pixel value difference, the calculation module 110 can be configured to determine a set of calibration filter coefficients $\frac{1}{2}(f_{12,g0}$-$f_{12,g1})$. The filter circuit 120 can be configured to use the set of calibration filter coefficients $\frac{1}{2}(f_{12,g0}$-$f_{12,g1})$ to filter the input image data IM, thereby determining the pixel value correction amount $\frac{1}{2}(f_{12,g0}$-$f_{12,g1})$ V for the pixel value $Gr_{12}$ of the pixel $P_{12}$. Next, the filter circuit 120 can be configured to calibrate the pixel value $Gr_{12}$ to $(Gr_{12}$-$\frac{1}{2}(f_{12,g0}$-$f_{12,g1}))$ V according to the pixel value correction amount $\frac{1}{2}(f_{12,g0}$-$f_{12,g1})$ V.

It is worth noting that the above-described methods for performing pixel value calibration according to at least one set of calibration filter coefficients are provided for illustrative purposes, and are not intended to limit the scope of the present disclosure. In some embodiments, the pixel value correction amount is not limited to half of a pixel value difference between a pixel value of a pixel in the color plane $G_0'$ and a pixel value of the pixel in the color plane $G_1'$. In some embodiments, the filter circuit 120 can use two sets of calibration filter coefficients $f_{12,g0}$ and $f_{12,g0}$ to filter the input image data IM to obtain the estimated pixel value $G_0'(12)$ and the estimated pixel value $G_1'(12)$, respectively. Next, the filter circuit 120 can determine a pixel value correction amount, e.g. $\frac{1}{2}(G_0'(12)$-$G_1'(12))$, according to a difference between the estimated pixel value $G_0'(12)$ and the estimated pixel value $G_1'(12)$, and accordingly calibrate the pixel value $Gr_{12}$.

In some embodiments, the calculation module 110 can be configured to determine a set of calibration filter coefficients $\frac{1}{2}(f_{12,g0}$+$f_{12,g1})$. The filter circuit 120 can use the set of calibration filter coefficients $\frac{1}{2}(f_{12,g0}$+$f_{12,g1})$ to filter the input image data IM, thereby calibrating the pixel value $Gr_{12}$ to an average value $\frac{1}{2}(f_{12,g0}$+$f_{12,g1})$ V of the estimated pixel value $G_0'(12)$ for the pixel $P_{12}$ in the color plane $G_0'$ and the estimated pixel value $G_1'(12)$ for the pixel $P_{12}$ in the color plane $G_1'$. In some embodiments, the filter circuit 120 can use two sets of calibration filter coefficients $f_{12,g0}$ and $f_{12,g1}$ to filter the input image data IM as to obtain the estimated pixel value $G_0'(12)$ and the estimated pixel value $G_1'(12)$, respectively. Next, the filter circuit 120 can calibrate the pixel value $Gr_{12}$ to an average value $\frac{1}{2}(G_0'(12)$+$G_1'(12))$ of the estimated pixel value $G_0'(12)$ and the estimated pixel value $G_1'(12)$.

Although described with reference to the center pixel of the pixels $P_0$-$P_{24}$ in the above embodiments, the proposed pixel value calibration scheme can be applied to other pixels of interest, e.g. other Gr pixels or Gb pixels, without departing from the scope of the present disclosure.

The above description is provided for illustrative purposes, and is not intended to limit the scope of the present disclosure. In some embodiments, the difference function $f(\{R\},\{T\})$ shown in FIG. 1 is not limited to be implemented using a weighted squared deviation. For example, the weights respectively corresponding to the image smoothness, the structure similarity, the data consistency and the texture detail shown in FIG. 5 can be the same. In other words, the difference function $f(\{R\},\{T\})$ shown in FIG. 1 can be implemented using a sum of squares of errors between the groups of filter response values $R_{smooth,g0}$, $R_{smooth,g1}$, $R_{struct}$, $R_{subraw,g0}$, $R_{subraw,g1}$ and $R_{approx}$ and the groups of target values $T_{smooth,g0}$ and $T_{smooth,g1}$, $T_{struct}$, $T_{subraw,g0}$, $T_{subraw,g1}$ and $T_{approx}$ shown in FIG. 3. As another example, the difference function $f(\{R\},\{T\})$ shown in FIG. 1 can be implemented using a sum of absolute values of deviation between each group of filter response values and a corresponding group of target values.

In some embodiments, the filter circuit design may not take all of the image smoothness, the structure similarity, the data consistency and the texture detail into consideration. For example, it is possible to design a filter circuit without considering one or more image characteristics associated with the image smoothness, the structure similarity, the data consistency and the texture detail.

In some embodiments, the proposed pixel value calibration scheme can be applied in an RYYB color filter array, which is a filter design utilizing one red filter, one blue filter and two yellow filters, a CYYM color filter array, which is a filter design utilizing one cyan filter, one magenta filter and two yellow filters, or other types of color filter arrays. For example, when employed in the RYYB color filter array, the proposed pixel value calibration scheme can be used to correct errors caused by pixel crosstalk between two yellow pixels, one of which is located in a same row as a red pixel while the other is located in a same row as a blue pixel. As another example, when employed in the CYYM color filter array, the proposed pixel value calibration scheme can be used to correct errors caused by pixel crosstalk between two yellow pixels, one of which is located in a same row as a cyan pixel while the other is located in a same row as a magenta pixel.

As long as a pixel value calibration scheme can determine a difference function associated with a plurality groups of filter response values of estimated image data in different color planes and a plurality of groups of target values, determine at least one set of calibration filter coefficients by calculating a solution of the estimated image data which results in a minimum value of the difference function, and allow a filter circuit to estimate a pixel value difference (or a pixel value calibration amount) between different color planes in real time to thereby perform pixel value calibration, various variations and alternatives fall with the spirit and scope of the present disclosure.

Figure 7:
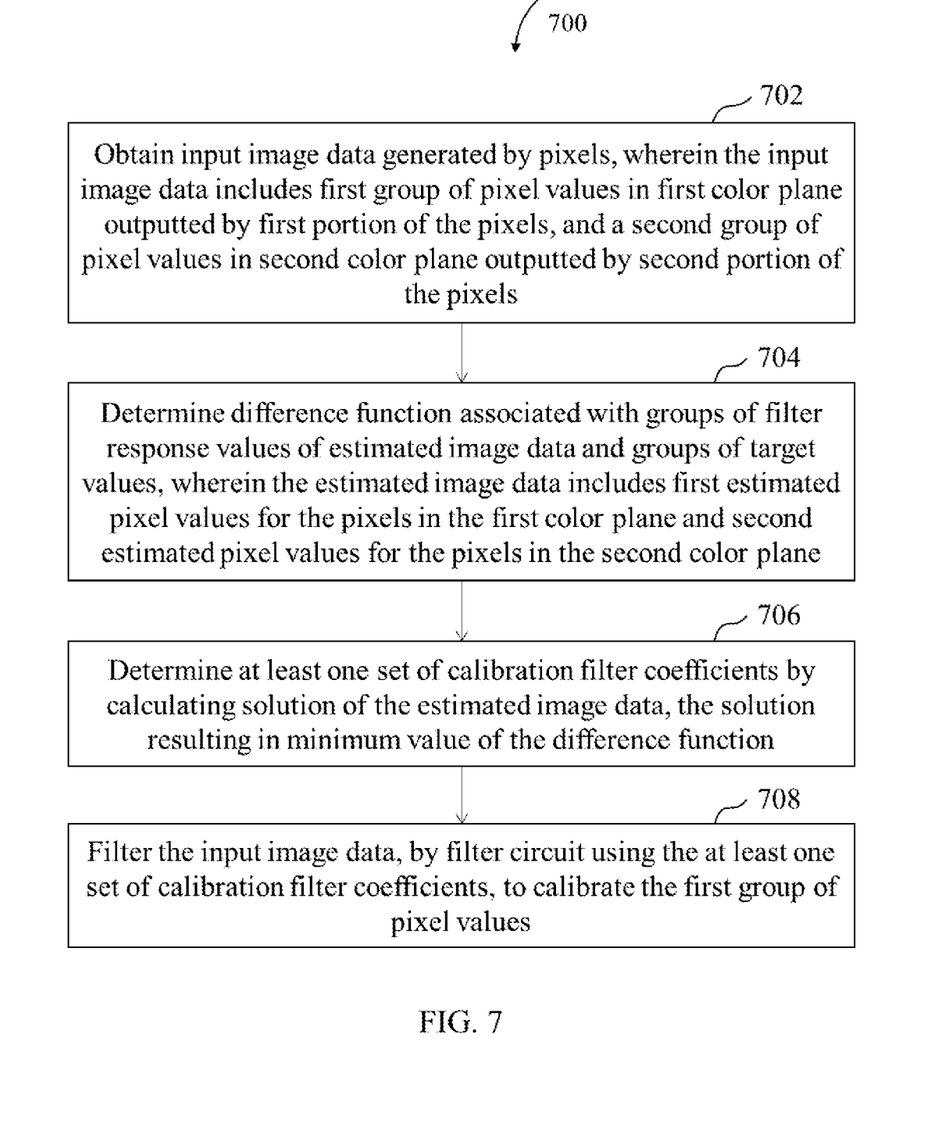
FIG. 7 is a flow chart of an exemplary pixel value calibration method in accordance with some embodiments of the present disclosure.

FIG. 7 is a flow chart of an exemplary pixel value calibration method in accordance with some embodiments of the present disclosure. For illustrative purposes, the pixel value calibration method 700 is described with reference to the pixel value calibration device 100 shown in FIG. 1, the input image data IM shown in FIG. 2 and the difference function fd shown in FIG. 5. However, this is not meant to be a limitation of the present disclosure. Additionally, in some embodiments, other steps can be performed in the pixel value calibration method 700. The pixel value calibration method 700 can be summarized below.

In step 702, input image data generated by a plurality of pixels is obtained. The input image data includes a first group of pixel values in a first color plane outputted by a first portion of the pixels, and a second group of pixel values in a second color plane outputted by a second portion of the pixels. For example, the calculation module 110 can obtain the input image data IM generated by the pixels $P_0$-$P_{24}$, which include a first group of pixel values in the Gr plane outputted by the pixels $P_0$, $P_2$, $P_4$, $P_6$, $P_8$, $P_{10}$, $P_{12}$, $P_{14}$, $P_{16}$, $P_{18}$, $P_2$, $P_{22}$ and $P_{24}$, i.e. the pixel values $Gr_0$, $Gr_2$, $Gr_4$, $Gr_{10}$, $Gr_{12}$, $Gr_{14}$, $Gr_{20}$, $Gr_{22}$ and $Gr_{24}$, and a second group of pixel values in the Gb plane outputted by the pixels $P_6$, $P_8$, $P_{16}$ and $P_{18}$, i.e. the pixel values $Gb_6$, $Gb_8$, $Gb_{16}$ and $Gb_{18}$.

In step 704, a difference function associated with a plurality of groups of filter response values of estimated image data and a plurality of groups of target values is determined. The estimated image data includes a plurality of first estimated pixel values for the pixels in the first color plane and a plurality of second estimated pixel values for the pixels in the second color plane. The groups of filter response values are generated by utilizing a plurality of sets of characteristic filter coefficients to filter the first estimated pixel values and the second estimated pixel values. An anticipated pixel value of each pixel in the second portion of the pixels in the first color plane serves as a first group of target values in the groups of target values. For example, the calculation module 110 can determine a difference function associated with the groups of filter response values {R} of the estimated image data EM and the groups of target values {T}, e.g. the difference function fd. In some embodiments, the groups of filter response values {R} can be obtained by using the sets of characteristic filter coefficients $M_{smooth}$, $M_{struct}$, $M_{subraw,g0}$, $M_{subraw,g1}$ and $M_{approx}$ to filter the estimated pixel values $G_0'(0)$-$G_0'(24)$ in the color plane $G_0'$ and the estimated pixel values $G_1'(0)$-$G_1'(24)$ in the color plane $G_1'$ included in the estimated image data EM. In some embodiments where the color plane $G_0'$ and the color plane $G_1'$ are the Gr plane and the Gb plane respectively, the estimated pixel value for each Gb pixel in the Gr plane can serve as a group of target values in the groups of target values {T} such that pixel values corresponding to adjacent columns/rows of pixels in the reconstructed Gr plane can exhibit brightness variations between the columns/rows of pixels.

In step 706, at least one set of calibration filter coefficients is determined by calculating a solution of the estimated image data, wherein the solution results in a minimum value of the difference function. For example, the calculation module 110 can calculate a solution of the estimated image data EM which results in a minimum value of the difference function fd, thereby determining the at least one set of calibration filter coefficients {C}. In some embodiments, the calculation module 110 can use a least squares method to calculate an optimal solution of the estimated image data EM that results in a minimum value of the difference function fd, thereby determining the at least one set of calibration filter coefficients {C}.

In step 708, the input image data is filtered by a filter circuit using the at least one set of calibration filter coefficients to thereby calibrate the first group of pixel values. For example, the filter circuit 120 can use the at least one set of calibration filter coefficients {C} to filter the input image data IM, thereby calibrating the pixel values $Gr_0$, $Gr_2$, $Gr_4$, $Gr_{10}$, $Gr_{12}$, $Gr_{14}$, $Gr_{20}$, $Gr_{22}$ and $Gr_{24}$. In some embodiments, the filter circuit 120 can use the set of calibration filter coefficients $\frac{1}{2}(f_{12,g0}-f_{12,g1})$ to filter the input image data IM to thereby determine the pixel value correction amount $\frac{1}{2}(f_{12,g0}-f_{12,g1})$ V for the pixel value $Gr_{12}$, and accordingly correct the pixel value $Gr_{12}$.

In some embodiments, in step 702, the first group of pixel values can be pixel values outputted by Gb pixels, such as the pixel values $Gb_6$, $Gb_8$, $Gb_{16}$ and $Gb_{18}$, and the second group of pixel values can be pixel values outputted by Gr pixels, such as the pixel values $Gr_0$, $Gr_2$, $Gr_4$, $Gr_{10}$, $Gr_{12}$, $Gr_{14}$, $Gr_{20}$, $Gr_{22}$ and $Gr_{24}$. In other words, a pixel value to be calibrated can be a pixel value of a Gb pixel included in the input image data IM.

In some embodiments, in step 702, each pixel in the first portion of the pixels is located in a same row as a pixel having a first color and has a second color. Each pixel in the second portion of the pixels is located in a same row as a pixel having a third color and has the second color. For example, in some cases where the pixels $P_0$-$P_{24}$ are arranged in correspondence with an RGGB color filter array, the first color, the second color and the third color can be red, green and blue respectively, or can be blue, green and red respectively. Errors caused by pixel crosstalk between two green pixels, i.e. a Gr pixel and a Gb pixel, can be corrected accordingly. In other words, the first group of pixel values to be calibrated can be pixel value(s) of Gr pixel(s) or pixel value(s) of Gb pixel(s) included in the input image data IM. As another example, in some cases where the pixels $P_0$-$P_{24}$ are arranged in correspondence with an RYYB color filter array, the first color, the second color and the third color can be red, yellow and blue respectively, or can be blue, yellow and red respectively. Errors caused by pixel crosstalk between two yellow pixels, one of which is located in a same row as a red pixel while the other is located in a same row as a blue pixel, can be corrected accordingly.

As a person skilled in the art can appreciate operation of each step of the pixel value calibration method 700 after reading the above paragraphs directed to FIG. 1 to FIG. 6, further description is omitted here for brevity.

With the use of suitable/optimal filter design, the proposed pixel value calibration scheme can reconstruct different color planes, such as a complete Gb plane or Gr plane, according to real-time image data, thereby estimating and calibrating a pixel value difference between different color planes. Alternatively, the proposed pixel value calibration scheme can estimate and calibrate a difference between pixel values for a same pixel in different color planes.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A pixel value calibration method, comprising:
    obtaining input image data generated by a plurality of pixels, wherein the input image data comprises a first group of pixel values in a first color plane outputted by a first portion of the pixels, and a second group of pixel values in a second color plane outputted by a second portion of the pixels;
    determining a difference function associated with a plurality of groups of filter response values of estimated image data and a plurality of groups of target values, wherein the estimated image data comprises a plurality of first estimated pixel values for the pixels in the first color plane and a plurality of second estimated pixel values for the pixels in the second color plane; the groups of filter response values are generated by utilizing a plurality of sets of characteristic filter coefficients to filter the first estimated pixel values and the second estimated pixel values; an anticipated pixel value of each pixel in the second portion of the pixels in the first color plane serves as a first group of target values in the groups of target values;
    determining at least one set of calibration filter coefficients by calculating a solution of the estimated image data, the solution resulting in a minimum value of the difference function; and
    filtering the input image data, by a filter circuit using the at least one set of calibration filter coefficients, to calibrate the first group of pixel values.

2. The pixel value calibration method of claim 1, wherein the pixels are arranged in a plurality of rows; each pixel in the first portion of the pixels is located in a same row as a pixel having a first color and has a second color; and each pixel in the second portion of the pixels is located in a same row as a pixel having a third color and has the second color.

3. The pixel value calibration method of claim 1, wherein the step of determining the at least one set of calibration filter coefficients by calculating the solution of the estimated image data comprises:
    using a least-squares method to calculate the solution of the estimated image data resulting in the minimum value of the difference function, wherein the groups of filter response values are expressed as a data matrix multiplied by an estimated vector, the data matrix is associated with the sets of characteristic filter coefficients, and the estimated vector is associated with the first estimated pixel values and the second estimated pixel values; and
    determining the at least one set of calibration filter coefficients according to the data matrix.

4. The pixel value calibration method of claim 3, wherein a first estimated pixel value and a second estimated pixel value for a pixel of interest of the pixels are located in a first row and a second row of the estimated vector, respectively; the step of determining the at least one set of calibration filter coefficients according to the data matrix comprises:
    determining a filter matrix by multiplying an inverse matrix of a product of a transposed matrix of the data matrix and the data matrix with the transposed matrix; and
    determining the at least one set of calibration filter coefficients according to one row of the filter matrix corresponding to the first row of the estimated vector and another row of the filter matrix corresponding to the second row of the estimated vector.

5. The pixel value calibration method of claim 1, wherein the step of determining the difference function associated with the groups of filter response values and the groups of target values comprises:
    determining a weighted squared deviation between the groups of filter response values and the groups of target values, the weighted squared deviation serving as the difference function.

6. The pixel value calibration method of claim 1, wherein the step of calibrating the first group of pixel values comprises:
    using the at least one set of calibration filter coefficients to filter the input image data to determine a pixel value correction amount for a pixel value in the first group of pixel values; and
    calibrating the pixel value according to the pixel value correction amount.

7. The pixel value calibration method of claim 1, wherein the step of calibrating the first group of pixel values comprises:
    using the at least one set of calibration filter coefficients to filter the input image data to calibrate a pixel value of a pixel in the first group of pixel values to an average value of the first estimated pixel value for the pixel in the first color plane and the second estimated pixel for the pixel in the second color plane.

8. The pixel value calibration method of claim 1, wherein the sets of characteristic filter coefficients comprise a first set of characteristic filter coefficients, configured to sample the first estimated pixel value for each pixel in the first portion of the pixels to generate a first set of filter response values in the groups of filter response values; the first group of filter response value corresponds to the first group of target values.

9. The pixel value calibration method of claim 8, wherein the groups of target values further comprise a second group of target values and a third group of target values; the second group of target values is determined according to the first group of pixel values, and the third group of target values is determined according to the second group of pixel values; the sets of characteristic filter coefficients further comprise a second set of characteristic filter coefficients and a third set of characteristic filter coefficients; the second set of characteristic filter coefficients is configured to sample the first estimated pixel value for each pixel in the first portion of the pixels to generate a second group of filter response values in the groups of filter response values, and the second group of filter response values corresponds to the second group of target values; the third set of characteristic filter coefficients is configured to sample the second estimated pixel value for each pixel in the second portion of the pixels to generate a third group of filter response values in the groups of filter response values, and the third group of filter response values corresponds to the third group of target values.

10. The pixel value calibration method of claim 9, wherein the groups of target values further comprise a fourth group of target values, a fifth group of target values and a sixth target value; the fourth group of target values is determined according to a high frequency component of the input image data in the first color plane, the fifth group of target values is determined according to a high frequency component of the input image data in the second color plane, and the sixth group of target values is determined according to a change in a pixel value difference between the corresponding first estimated pixel value and the corresponding second estimated pixel value for each of the pixels; the sets of characteristic filter coefficients further comprise a fourth set of characteristic filter coefficients, a fifth set of characteristic filter coefficients and a sixth set of characteristic filter coefficients; the fourth set of characteristic filter coefficients is configured to perform high-pass filtering on the first estimated pixel values to generate a fourth group of filter response values in the groups of filter response values, and the fourth group of filter response values corresponds to the fourth group of target values; the fifth set of characteristic filter coefficients is configured to perform high-pass filtering on the second estimated pixel values to generate a fifth group of filter response values in the groups of filter response values, and the fifth group of filter response values corresponds to the fifth group of target values; the sixth set of characteristic filter coefficients is configured to perform high-pass filtering on the pixel value difference between the corresponding first estimated pixel value and the corresponding second estimated pixel value for each of the pixels, and accordingly generate a sixth group of filter response values in the groups of filter response values; the sixth group of filter response values corresponds to the sixth group of target values.

11. A pixel value calibration device, comprising:
a calculation module, configured to:
obtain input image data generated by a plurality of pixels, wherein the input image data comprises a first group of pixel values in a first color plane outputted by a first portion of the pixels, and a second group of pixel values in a second color plane outputted by a second portion of the pixels;
determine a difference function associated with a plurality of groups of filter response values of estimated image data and a plurality of groups of target values, wherein the estimated image data comprises a plurality of first estimated pixel values for the pixels in the first color plane and a plurality of second estimated pixel values for the pixels in the second color plane; the groups of filter response values are generated by utilizing a plurality of sets of characteristic filter coefficients to filter the first estimated pixel values and the second estimated pixel values; an anticipated pixel value of each pixel in the second portion of the pixels in the first color plane serves as a first group of target values in the groups of target values; and
determine at least one set of calibration filter coefficients by calculating a solution of the estimated image data, the solution resulting in a minimum value of the difference function; and
a filter circuit, coupled to the calculation module, the filter circuit being configured to use the at least one set of calibration filter coefficients to filter the input image data to calibrate the first group of pixel values.

12. The pixel value calibration device of claim 11, wherein the pixels are arranged in a plurality of rows; each pixel in the first portion of the pixels is located in a same row as a pixel having a first color and has a second color; and each pixel in the second portion of the pixels is located in a same row as a pixel having a third color and has the second color.

13. The pixel value calibration device of claim 11, wherein the calculation module is configured to use a least-squares method to calculate the solution of the estimated image data resulting in the minimum value of the difference function; the groups of filter response values are expressed as a data matrix multiplied by an estimated vector, the data matrix is associated with the sets of characteristic filter coefficients, and the estimated vector is associated with the first estimated pixel values and the second estimated pixel values; and the calculation module is further configured to determine the at least one set of calibration filter coefficients according to the data matrix.

14. The pixel value calibration device of claim 13, wherein a first estimated pixel value and a second estimated pixel value for a pixel of interest of the pixels are located in a first row and a second row of the estimated vector, respectively; the calculation module is configured to determine a filter matrix by multiplying an inverse matrix of a product of a transposed matrix of the data matrix and the data matrix with the transposed matrix, and determine the at least one set of calibration filter coefficients according to one row of the filter matrix corresponding to the first row of the estimated vector and another row of the filter matrix corresponding to the second row of the estimated vector.

15. The pixel value calibration device of claim 11, wherein the calculation module is configured to determine a weighted squared deviation between the groups of filter response values and the groups of target values, and the weighted squared deviation serve as the difference function.

16. The pixel value calibration device of claim 11, wherein the filter circuit is configured to use the at least one set of calibration filter coefficients to filter the input image data to determine a pixel value correction amount for a pixel value in the first group of pixel values, and calibrate the pixel value according to the pixel value correction amount.

17. The pixel value calibration device of claim 11, wherein the filter circuit is configured to use the at least one set of calibration filter coefficients to filter the input image data to calibrate a pixel value of a pixel in the first group of pixel values to an average value of the first estimated pixel value for the pixel in the first color plane and the second estimated pixel for the pixel in the second color plane.

18. The pixel value calibration device of claim 11, wherein the sets of characteristic filter coefficients comprise a first set of characteristic filter coefficients, configured to sample the first estimated pixel value for each pixel in the first portion of the pixels to generate a first set of filter response values in the groups of filter response values; the first group of filter response value corresponds to the first group of target values.

19. The pixel value calibration device of claim 18, wherein the groups of target values further comprise a second group of target values and a third group of target values; the second group of target values is determined according to the first group of pixel values, and the third group of target values is determined according to the second group of pixel values; the sets of characteristic filter coefficients further comprise a second set of characteristic filter coefficients and a third set of characteristic filter coefficients; the second set of characteristic filter coefficients is configured to sample the first estimated pixel value for each pixel in the first portion of the pixels to generate a second group of filter response values in the groups of filter response values, and the second group of filter response values corresponds to the second group of target values; the third set of characteristic filter coefficients is configured to sample the second estimated pixel value for each pixel in the second portion of the pixels to generate a third group of filter response values in the groups of filter response values, and the third group of filter response values corresponds to the third group of target values.

20. The pixel value calibration device of claim 19, wherein the groups of target values further comprise a fourth group of target values, a fifth group of target values and a sixth target value; the fourth group of target values is determined according to a high frequency component of the input image data in the first color plane, the fifth group of target values is determined according to a high frequency component of the input image data in the second color plane, and the sixth group of target values is determined according to a change in a pixel value difference between the corresponding first estimated pixel value and the corresponding second estimated pixel value for each of the pixels; the sets of characteristic filter coefficients further comprise a fourth set of characteristic filter coefficients, a fifth set of characteristic filter coefficients and a sixth set of characteristic filter coefficients; the fourth set of characteristic filter coefficients is configured to perform high-pass filtering on the first estimated pixel values to generate a fourth group of filter response values in the groups of filter response values, and the fourth group of filter response values corresponds to the fourth group of target values; the fifth set of characteristic filter coefficients is configured to perform high-pass filtering on the second estimated pixel values to generate a fifth group of filter response values in the groups of filter response values, and the fifth group of filter response values corresponds to the fifth group of target values; the sixth set of characteristic filter coefficients is configured to perform high-pass filtering on the pixel value difference between the corresponding first estimated pixel value and the corresponding second estimated pixel value for each of the pixels, and accordingly generate a sixth group of filter response values in the groups of filter response values; the sixth group of filter response values corresponds to the sixth group of target values.

* * * * *